United States Patent Office 3,598,856
Patented Aug. 10, 1971

3,598,856
t-ALKYL PENTACHLOROPHENYL CARBONATE
Masahiko Fujino, Takarazuka, Hyogo, and Chitoshi Hatanaka, Suita, Japan, assignors to Takeda Chemical Industries, Ltd., Osaka, Japan
No Drawing. Filed Apr. 18, 1968, Ser. No. 722,218
Claims priority, application Japan, Apr. 20, 1967, 42/25,289
Int. Cl. C07c 69/00, 125/06; C07d 27/60
U.S. Cl. 260—463                           1 Claim

ABSTRACT OF THE DISCLOSURE

The compounds t-butyl pentachlorophenyl carbonate and t-amyl pentachlorophenyl carbonate are excellent t-alkoxycarbonylating agents, especially useful in the industrial production of peptides and t-alkoxycarbonylamino compounds generally.

---

This invention relates to novel t-alkyl pentachlorophenyl carbonates which are useful, as for example, t-alkoxycarbonylating agents.

The introduction of a (tertiary alkoxy) carbonyl group such as the t-butyloxycarbonyl or the t-amyloxycarbonyl group for the protection of an amino group has undeniably been a major contribution to recent outstanding developments in peptide syntheses.

For the purpose of N-protection by the t-alkoxycarbonyl group, there have been proposed a number of t-alkoxycarbonylating agents such as t-butyl p-nitrophenyl carbonate, t-butyl cyanoformate, t-butyl N-hydrosuccinimidate, t-amyl chloroformate and t-butyl-azidoformate.

However, none of these known agents is satisfactorily applicable to the industrial production of peptides because of one or more drawbacks such as complexity in the preparation of the agents themeselves or in the N-t-alkoxycarbonylation procedure by means of the agents; the necessity of using costly starting materials for such preparation; the poor stability of the agents; the low yield of the objective N-protected amino compounds; etc.

According to the present invention, a t-alkyl pentachlorophenyl carbonate is unexpectedly and readily prepared in good yield in a stable crystalline form and is quite useful as N-t-alkoxycarbonylating agent, for example, for the production of t-alkoxycarbonylamino compounds.

It is a principal object of the present invention to provide a new t-alkyl pentachlorophenyl carbonate, which is useful, for example, as an N-t-alkoxycarbonylating agent.

Another object is to provide a method for producing the novel and useful t-alkyl pentachlorophenyl carbonate.

A further object of the present invention is to provide a new and improved means for N-t-alkoxycarbonylation of an amino compound by the use of the t-alkyl pentachlorophenyl carbonate.

The first two objects of this invention are realized by reacting pentachlorophenyl chloroformate (I) with tertiary alcohol (II),

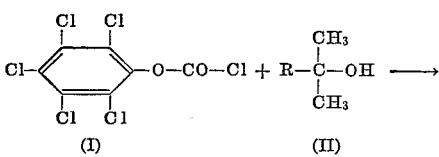

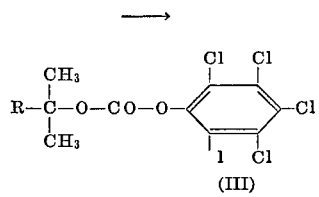

wherein R is methyl or ethyl.

The reaction is carried out in an inert organic solvent. Inert organic solvents which are advantageously used in this reaction, include, for example, non-polar organic solvents such as benzene, tetrahydrofuran, ether, etc.

The reaction can be carried out in the presence of a tertiary amine. As tertiary amine, there may be employed, for example, pyridine, aliphatic amines having at most 15 carbon atoms such as dialkylethanolamine (e.g. dimethylethanolamine, diethylethanolamine), trialkylamine (e.g. trimethylamine, triethylamine), N-alkylmorpholine (e.g. N-methyl-morpholine, N-ethylmorpholine), N-alkylaniline (e.g. N-methylaniline, N-ethylaniline).

The reaction proceeds at room temperature (about 0° C. to 30° C.) and, if desired, may be carried out under cooling.

The reaction time required varies mainly with the reaction temperature. Generally, the reaction time required is from about 1 to 5 hours, advantageously from 2 to 3 hours.

Thus-produced t-alkyl pentachlorophenyl carbonate is isolated from the reaction mixture, for example, by filtration of solid matter if any, concentration, and recrystallization, and is obtained as stable crystals.

In spite of its own high stability, the t-alkyl pentachlorophenyl carbonate shows a moderate reactivity against an amino group in an amino compound, and is therefore used as suitable N-t-alkoxycarbonylating agent as mentioned above.

One of the most important applications of the compound lies in the industrial production of N-protected amino compounds in peptide syntheses.

Therefore, the novel compounds of this invention are of high commercial value as N-t-alkoxycarbonylating reagents which by themselves constitute valuable commercial products.

By the use of the t-alkyl pentachlorophenyl carbonate in place of a conventional N-t-alkoxycarbonylating agent, industrial production of N-protected amino compound is easily realized with good yield. More concrete examples of the application of the t-alkyl pentachlorophenyl carbonate to the synthesis of known and useful t-alkoxycarbonylamines are shown in working examples, infra.

In these reactions, the amino compound used is a primary or a secondary amine. Thus, such widely diverse materials as various amino acids and their derivatives, peptides and their derivatives, and various hydrazines are utilized.

The above-mentioned amino acids include, among others, alanine, isoleucine, methionine, nitroarginine, tryptophane, aspartic acid, etc., as well as the sodium, potassium, magnesium and other salts of such amino acids. The derivatives of said amino acids include their acid esters, acid amides and the like.

When the amino compound has alcoholic OH, phenolic OH and/or carboxylic radicals, the amino radical preferentially takes part in the reaction and can be selectively protected by t-alkoxycarbonyl.

The following working examples illustrate the present invention.

In the examples, "g." and "ml." are "grams" and "milliliters," respectively.

EXAMPLE 1

Preparation of pentachlorophenyl chloroformate

A solution of 266.5 g. (1 mol) of pentachlorophenol in 800 ml. of tetrahydrofuran is cooled to 5° C. To the solution, there is added 120 g. (1.2 mols) of phosgene, and a solution of 140 ml. (1 mol) of triethylamine in 300 ml. of tetrahydrofuran is gradually added thereto under stirring. The reaction mixture is stirred for 2 hours at room temperature, and then is heated at 60° C. for 30 minutes to remove an excess of phosgene, and filtered to remove triethylamine hydrochloride produced in the reaction mixture. The mother liquor is concentrated to leave a residue, which is crystallized from petroleum benzine to obtain 271.5 g. of pentachlorophenyl chloroformate as colorless pillars melting at 56° to 58° C. Yield 82%.

*Analysis.*—Calculated for $C_7Cl_6O_2$ (percent): C, 25.41; Cl, 64.91. Found (percent): C, 25.50; Cl, 64.97.

EXAMPLE 2

Synthesis of t-butyl pentachlorophenyl carbonate (a) To a solution of 366.5 g. (1 mol) of pentachlorophenyl chloroformate in 700 ml. of dry benzene, there is added 111 g. (1.5 mol) of t-butyl alcohol, and then 158 g. (2 mols) of pyridine is gradually added to the mixture under stirring at room temperature. The whole mixture is further stirred at room temperature for 2 hours. After the reaction, the produced precipitates are filtered off and the mother liquor is concentrated to give precipitates, which are recrystallized from petroleum benzine or a mixture of benzene and ethanol, and washed with cold ethanol to obtain 294 g. of t-butyl pentachlorophenyl carbonate as colorles needles melting at 116° to 117° C. Yield 80%.

*Analysis.*—Calculated for $C_{11}H_9O_3Cl_5$ (percent): C, 36.05; H, 2.48; Cl, 48.38. Found (percent): C, 36.04; H, 2.39; Cl, 48.39.

(b) The reaction is carried out in the same manner as in Example 1, and after the excess of phosgene is removed, the reaction mixture is cooled to room temperature. To the mixture, there are gradually added 11 g. (1.5 mols) of t-butyl alcohol and 158 g. (2 mols) of pyridine.

The whole mixture is stirred at room temperature for 2 hours, and filtered to remove pyridine hydrochloride produced in the mixture. The mother liquor is concentrated to give precipitates, which are recrystallized from benzene-ethanol to obtain 213 g. of t-butyl pentachlorophenyl carbonate as needles melting at 116° to 117° C. Yield 58%.

EXAMPLE 3

Synthesis of t-amyl pentachlorophenyl carbonate

The same procedure as in Example 2(a), except that 132 g. (1.5 mols) of t-amyl alcohol is used in lieu of the 111 g. of t-butyl alcohol, affords 316 g. of t-amyl pentachlorophenyl carbonate as colorless prisms melting at 88° to 89° C. Yield 83%.

*Analysis.*—Calculated for $C_{12}H_{11}O_3Cl_5$ (percent): C, 37.88; H, 2.91; Cl, 46.58. Found (percent): C, 37.82; H, 2.91; Cl, 46.25.

Application of t-alkyl pentachlorophenyl carbonate:

(a) To synthesis of t-butyl carbazate

To a suspension of 367 g. (1 mol) of t-butyl pentachlorophenyl carbonate in 200 ml. of tetrahydrofuran there is added 120 ml. (2 mols) of hydrazine hydrate.

After 5 hours' standing, the tetrahydrofuran is distilled off to give sticky solid. The resulting solid is extracted with ether, and the ether extract is dried over anhydrous sodium sulfate, and concentrated under reduced pressure to leave a residue, which is distilled to obtain colorless liquid boiling at 70° C./5 mm. Hg.

The liquid soon solidifies into silk-like crystals (103 g.) of t-butyl carbazate melting at 39° C. Yield 78%.

*Analysis.*—Calculated for $C_5H_{12}O_2N_2$ (percent): C, 45.44; H, 9.15; N, 21.20. Found (percent): C, 45.51; H, 8.93; N, 21.21.

(b) To synthesis of N-t-butyloxycarbonyl-L-tryptophane

To a suspension of 8.17 g. (0.04 mol) of L-tryptophane in 40 ml. of dimethylformamide there is added 10 ml. of a 4 N-aqueous sodium hydroxide solution, whereupon the L-tryptophane dissolves in the solvent. To this solution there are added 17.6 g. (0.048 mol) of t-butyl pentachlorophenyl carbonate, 20 ml. of chloroform and 5.6 ml. (0.04 mol) of triethylamine under stirring, and then the mixture is stirred for 24 hours.

After the addition of 50 ml. of chloroform, the mixture is extracted three times with 80 ml., each time, of water. The combined extract is washed three times with 50 ml., each time, of ethyl acetate, acidified with 80 ml. of N-hydrochloric acid, and is extracted twice with 80 ml., each time, of ethyl acetate. The extract is washed three times with water, and dried over anhydrous sodium sulfate, and concentrated to obtain precipitates, which are recrystallized from ethyl acetate-petroleum benzine to obtain 8.80 g. of N-t-butyloxycarbonyl-L-tryptophane melting at 140° to 141° C. Yield 72%.

Specific rotation: $[\alpha]_D^{23} = -19.6°$ (c.=2.0, in glacial acetic acid).

*Analysis.*—Calculated for $C_{16}H_{20}O_4N_2$ (percent): C, 63.16; H, 6.63; N, 9.21. Found (percent): C, 63.19; H, 6.84; N, 9.14.

The yield, melting point and specific rotation of further compounds prepared by the same treatment as above are shown in the table, infra.

(c) To synthesis of dicyclohexylammonium N-t-amyloxycarbonyl-L-phenylalanate

To a suspension of 16.52 g. (0.1 mol) of L-phenylalanine in 100 ml. of dimethylformamide there is added 25 ml. of 4 N-aqueous sodium hydroxide solution under ice cooling, whereupon the L-phenylalanine dissolves in the solvent.

To the solution there are added 57.0 g. (0.15 mol) of t-amyl pentachlorophenyl carbonate, 50 ml. of chloroform and 14 ml. of triethylamine, and the whole mixture is stirred for 24 hours. After the reaction, 200 ml. of chloroform is added to the reaction mixture. The resultant mixture is extracted three times with 150 ml., each time, of water. The combined aqueous layer is washed three times with 150 ml., each time, of ethyl acetate, and after the addition of 200 ml. of N-hydrochloric acid, extracted three times with 100 ml., each time, of ethyl acetate. The ethyl acetate extract is washed with water, dried over anhydrous sodium sulfate, and concentrated to obtain 26.22 g. of N-t-amyloxycarbonyl-L-phenylalanine as an oil. Yield 93%.

Thus-obtained oil is dissolved in 50 ml. of ether. To the solution there is gradually added 50 ml. of ether containing 18.1 g. (0.1 mol) of dicyclohexylamine, and the mixture is left standing to give precipitates, which are collected by filtration and recrystallized from methanol-ethyl acetate to obtain 39.15 g. of dicyclohexylammonium N-t-amyloxycarbonyl-L-phenylalanate melting at 204° to 205° C. (decomp.).

Specific rotation: $[\alpha]_D^{23} = +35.2°$ (c.=0.5, in ethanol).

*Analysis.*—Calculated for $C_{27}H_{44}O_4N_2$ (percent): C, 70.40; H, 9.36; N, 6.08. Found (percent): C, 70.38; H, 9.49; N, 6.21.

(d) To syntheses of other N-t-alkoxycarbonylamino acids

The same procedure as in the above Example (b) or (c) except for the use of other amino acids as listed in the following table affords the corresponding N-t-alkoxycarbonylamino acids.

TABLE

| Amino acids | Yield (percent)[a] | Melting point (° C.) | Specific rotation $[\alpha]_d^{23}$ |
|---|---|---|---|
| t-Butyloxycarbonyl derivatives of: | | | |
|    Alanine | 61 | 73–74 | −24.5 (c=1.0, in acetic acid). |
|    Isoleucine | 64 | 50–58 | +2.8 (c=2, in acetic acid). |
|    Leucine | 71 | 70–73 | −24.2 (c=2, in acetic acid). |
|    Methionine | 87 | (c) | |
|    Nitroarginine | 63 | 102–104 | −5.8 (c=2, in dimethylformamide). |
|    Phenylalanine | 85 | 209–212 | +29.2 (c=1, in methanol). |
|    Proline | 71 | 135–137 | −59.1 (c=2, in acetic acid). |
|    Typtophane | 73 | 140.5–141 | −19.6 (c=2, in acetic acid). |
|    β-Benzyl-aspartic acid | 60 | 101 | −19.7 (c=2, in dimethylformamide). |
| t-Amyloxycarbonyl derivatives of: | | | |
|    Glycine | 67 | 80–82 | |
|    Methionine | 89 | (c) | |
|    Phenylalanine[b] | 90 | 204–206.5 | +35.2 (c=0.5, in ethanol). |
|    Tryptophane | 75 | 132–133 | +7.2 (c=1, in ethanol). |

[a] Yield of recrystallized product.    [b] Dicyclohexylammonium salt.    [c] Oily substance.

What is claimed is:
1. A compound of the formula

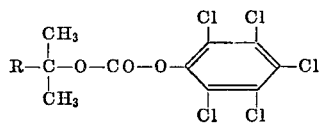

wherein R is methyl or ethyl.

References Cited

UNITED STATES PATENTS 2,567,987    9/1951    Baumgartner    71—2.3
2,754,229    7/1956    Fredenburg et al.    117—138.5

OTHER REFERENCES

Anderson et al.: J. Am. Chem. Soc., vol. 79, pp. 6180–3, pp. 6180–1 relied upon.

LEWIS GOTTS, Primary Examiner

D. G. RIVERS, Assistant Examiner

U.S. Cl. X.R.

260—326.14, 326.3, 471, 481, 482